(12) United States Patent
Gamberini et al.

(10) Patent No.: US 7,836,762 B2
(45) Date of Patent: Nov. 23, 2010

(54) APPARATUS FOR WEIGHING LIQUID IN A BOTTLE, IN PARTICULAR A PHARMACEUTICAL BOTTLE

(75) Inventors: Ernesto Gamberini, Rastignano (IT); Antonio Tagliavini, Bologna (IT)

(73) Assignee: MG 2 - S.r.l., Pianoro (IT)

( * ) Notice: Subject to any disclaimer, the term of this patent is extended or adjusted under 35 U.S.C. 154(b) by 219 days.

(21) Appl. No.: 11/752,712

(22) Filed: May 23, 2007

(65) Prior Publication Data

US 2008/0053211 A1    Mar. 6, 2008

(30) Foreign Application Priority Data

May 23, 2006    (EP)    ................... 06425347

(51) Int. Cl.
*G01F 23/26*    (2006.01)
(52) U.S. Cl. .................................... 73/304 C
(58) Field of Classification Search ................ 73/304 C
See application file for complete search history.

(56) References Cited

U.S. PATENT DOCUMENTS

| | | |
|---|---|---|
| 5,135,113 A | 8/1992 | Mayer et al. |
| 5,168,240 A * | 12/1992 | Howe .......................... 324/690 |
| 5,602,485 A | 2/1997 | Mayer et al. |
| 5,750,938 A | 5/1998 | De Caris et al. |
| 2003/0020493 A1 * | 1/2003 | Haase et al. ................. 324/664 |

FOREIGN PATENT DOCUMENTS

| | | |
|---|---|---|
| GB | 2283574 A | 5/1995 |
| WO | 2006/035285 A2 | 4/2006 |

* cited by examiner

*Primary Examiner*—Hezron Williams
*Assistant Examiner*—Alex Devito
(74) *Attorney, Agent, or Firm*—Seed IP Law Group PLLC

(57) ABSTRACT

An apparatus for weighing liquid in a bottle, in particular a pharmaceutical bottle. The apparatus has at least one measuring cell, and a conveying device for feeding a number of bottles through the measuring cell along a path. The apparatus is characterized in that the measuring cell has an actual measuring section preceded and followed, respectively, by a first guard section and a second guard section, which reduce the effect of adjacent bottles on the measurement.

8 Claims, 4 Drawing Sheets

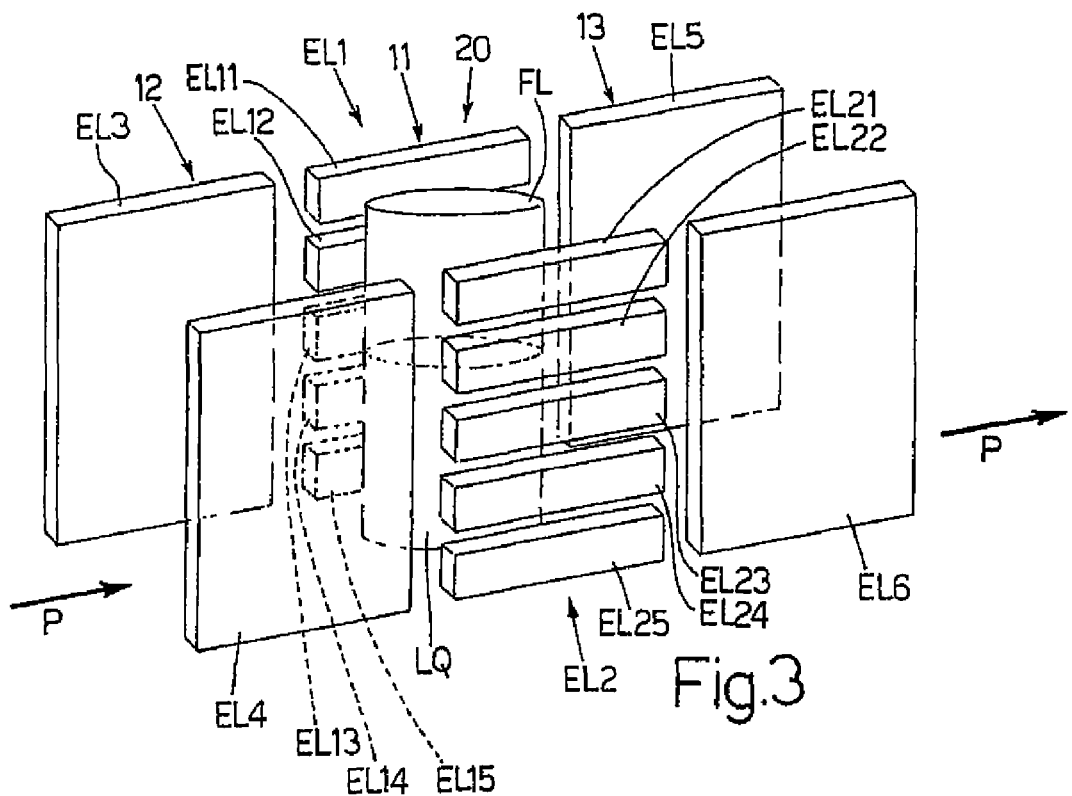
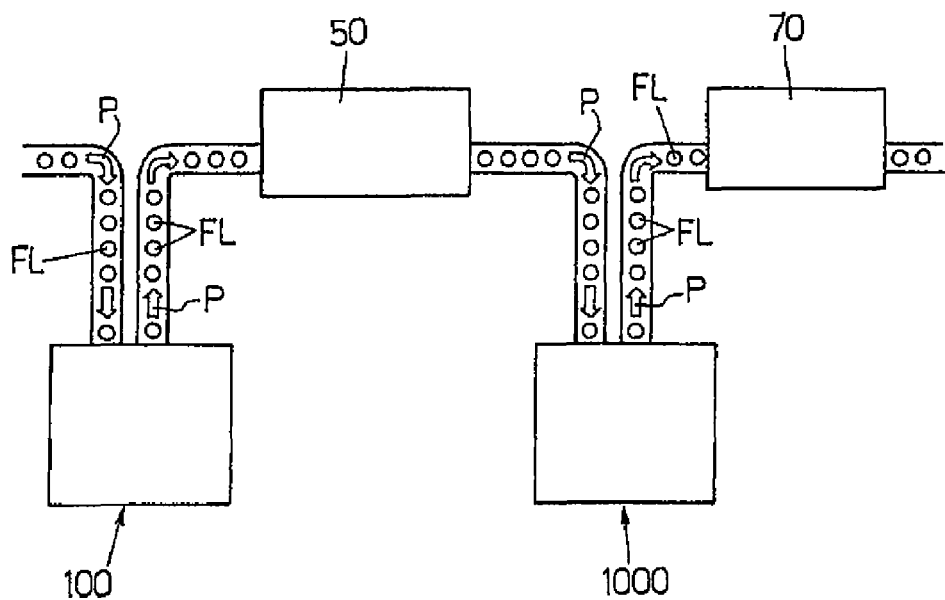

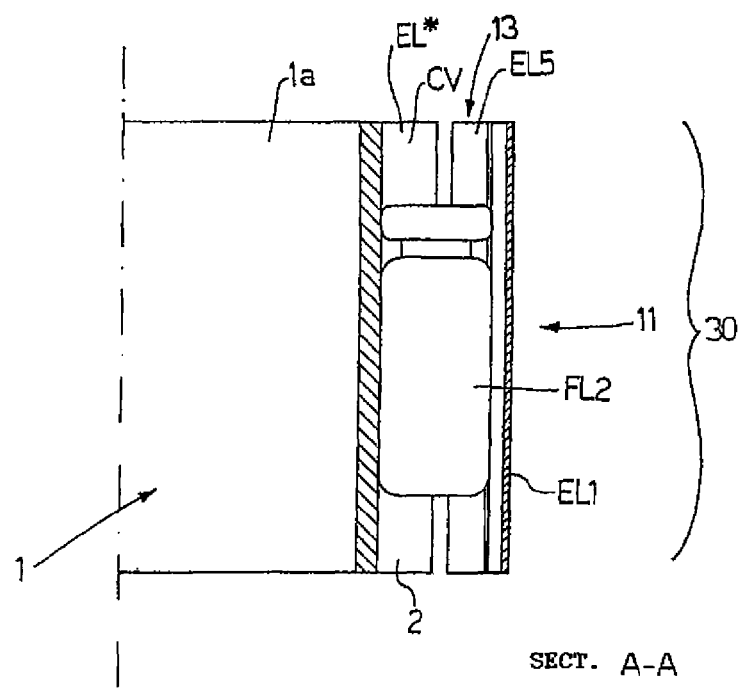
SECT. A-A
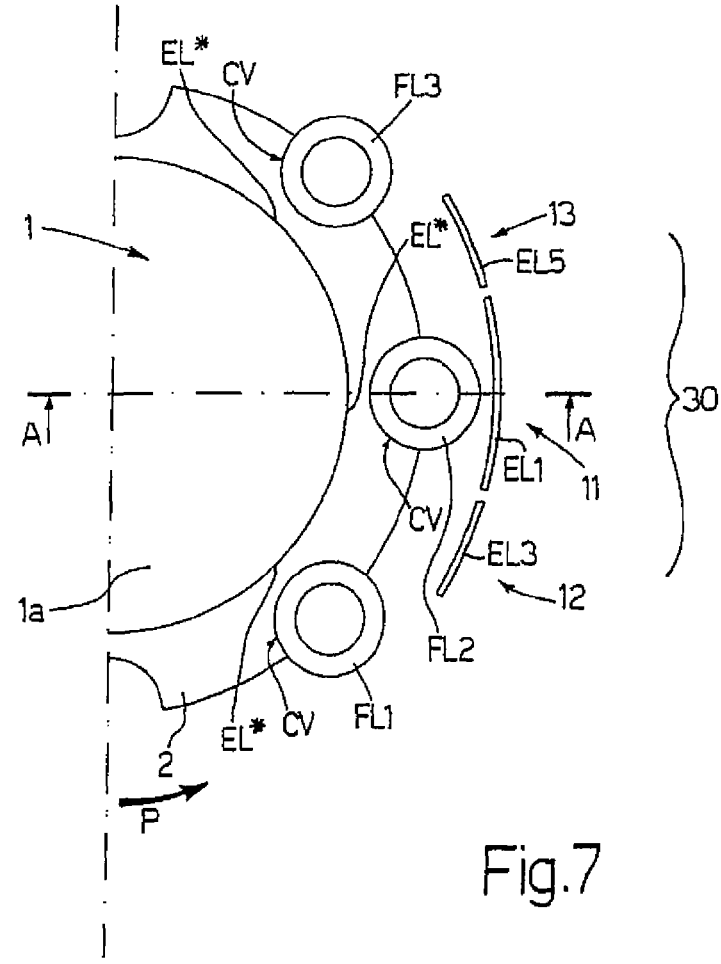
Fig.7

APPARATUS FOR WEIGHING LIQUID IN A BOTTLE, IN PARTICULAR A PHARMACEUTICAL BOTTLE

TECHNICAL FIELD

The present invention relates to an apparatus for measuring the amount of liquid in a bottle.

The present invention may be used to particular advantage, though not exclusively, for filling and sealing pharmaceutical bottles or other containers (phials, syringes) made of dielectric material (glass, plastic, ceramic), to which the following description refers purely by way of example.

In the present invention, the liquid content of bottles is measured using a capacitive technique, for use in particular on filling machines normally employed in the pharmaceutical industry, for 100% production dosage control.

The main advantage of employing the capacitive technique, and the measurement processing methods already developed by the Applicant and adapted to the measurement of liquids, lies in overcoming the time restrictions imposed by mechanical weighing, to permit on-line weighing of 100% production using low-cost equipment.

BACKGROUND

When weight control is required, bottle-filling machines are currently equipped with dynamometric scale systems, which at most provide for sample checking a percentage of production, on account of the intrinsic slowness of mechanical weighing systems with respect to the operating speed of the machine.

In the pharmaceutical industry, however, there is increasing demand for 100% control of the content of bottles, particularly of certain critical and/or high-cost (e.g., antitumor) drugs requiring highly precise dosage control.

The main purpose of 100% control is to ensure all the bottles are filled correctly, thus ensuring safe use of the product. 100% control also provides for obtaining, much faster than sample weighing methods, significant information concerning statistical production parameters, such as mean value and spread, which are vital for controlling correct adjustment and operation, respectively, of the metering device.

The importance of 100% control of liquids is also shown by the large sums invested in developing bulky, high-cost, intricate nuclear magnetic resonance systems for installation downstream from the filling section.

Capacitive measuring techniques are known and widely used, particularly for measuring movement, but to a much lesser degree for measuring material mass, though significant examples are known in the tobacco industry, and particularly in the pharmaceutical industry, relative to solid dielectric materials.

As regards liquids, the capacitive technique is frequently used for level measurement, one possible known embodiment of which is shown in attached FIG. 1.

In this, the variation in capacitance between two electrodes EL1, EL2—immersed in a liquid LQ or fitted, adjacent to the liquid, to the wall PT of a container CT—is proportional to level LV by virtue of the relative dielectric constant of liquid LQ.

As stated, the capacitive technique is also known to be used for measuring the solid content (powder, granules, tablets or microtablets) of pharmaceutical capsules using the gross-tare technique, as described, for example, in the Applicant's U.S. Pat. No. 5,750,938.

SUMMARY

The present invention provides for measuring liquid in bottles, in particular, pharmaceutical bottles, designed to be low cost and easy to produce.

According to the present invention, there is provided an apparatus for measuring the amount of liquid placed in bottles (in one embodiment, pharmaceutical bottles), as claimed in the attached claims.

The gross-tare technique is based on a capacitive measurement in two parts—a first of the empty capsule (tare), and a second of the same capsule when filled (gross)—and on processing the two measurements to obtain the net weight of the content.

It should be pointed out that the non-linearity of the capacitance/mass law applies only marginally, since, like other post-process quality control systems, the gross-tare technique aims at determining differences with respect to a specific nominal value, and so operates within a fairly narrow range of that value.

An inventive discovery shows this technique may also be applied to advantage, with appropriate provisions, to measuring liquids in bottles. For which purpose, several significant aspects make it even more advantageous than for capsules, particularly in the case of water-based drugs, like most injectable liquids.

In this case, in fact, gross-tare measuring precision is greatly enhanced by the relative dielectric constant ($\in$r) of glass being much lower than that of water, about 13 times.

The contribution of the container to the measurement is therefore much smaller than that of the drug.

In the case of capsules, on the other hand, the situation is reversed—on account of the dielectric constant of the gel shell normally being 3-4 times higher than that of the drug. This means that, assuming the same content to container volume ratio in both cases, the contribution of the container to the measurement is at least one order of magnitude smaller for liquids than for capsules. Consequently, in the present invention, the effect of tare evaluation errors on the net weight measurement is also two orders of magnitude smaller than for capsules.

Given small manufacturing tolerances of the container—as is usually the case—variations in the mass of the container result in only very minor variations in the measurement.

In certain cases, sufficiently precise measurement can therefore be made at one station.

In other words, given the above difference in the dielectric constants of the container and content, and, in view of the manufacturing precision involved, the very small net error caused by variations in the size and mass of glass containers, the contribution of the glass may be assumed constant.

Moreover, if the liquid has a strong saline content—as, for example, in the case of so-called physiological solution—dielectric losses at the measuring frequencies employed (tens or hundreds of kHz) are considerable for the liquid and negligible for the content.

The "reactive" component, which, in capacitance measurement, depends on resistive losses, is therefore unaffected by the glass container and only indicates the mass of the content.

The quantity and consistency of the liquid permitting, measurement can therefore be performed in one section by simply evaluating resistive losses.

The dielectric losses of the liquid permitting, single-section measurement is therefore possible using a combination of the above two methods—the second (reactive component measurement) confirming the first (constant glass contribution to the phase component).

It should be stressed that the above observations, while referring to glass bottles, which are currently the most commonly used, also apply to other types of containers, even of dielectric material other than glass, such as plastic or an organic container, such as a capsule, since these too have a very low dielectric constant with respect to that of water, and normally negligible dielectric losses at the measuring frequencies employed.

Capacitance measurement gives an indirect indication of mass, is affected by variable factors (drug composition, temperature, etc.), and may be calibrated and compared using an actual (gravimetric) weight measurement on a sample basis, in the same way as when measuring solids (powders, etc.). While the capacitive technique of this invention is a measurement of the amount of material added to a container, since the density and other properties of the material will be known, it can be referred to as technique to measure the mass or weight of a material added to a container.

The capacitive measurement is therefore preferably associated with a conventional weight measurement—obviously on a "sample" basis, because of the speed restrictions of dynamometric scales referred to above—which, by comparing the measurements of the same sample, permits continual checking and, if necessary, recalibration of the capacitive system.

In one particular embodiment, it is both mechanically and electrically convenient to combine both (capacitive and conventional "sample") measurements into one measuring system.

More specifically, in the case of the two-section (grosstare) system, the alteration in the incoming sequence produced by withdrawing and reinserting—obviously in a different position—the mechanically weighed samples must be taken into account.

The samples must also be identified accurately, since it is on the double (conventional and capacitive) measurement of the samples that the system is calibrated.

From the plant standpoint, such a system could replace the present withdrawal and sample measurement section with major advantages.

BRIEF DESCRIPTION OF THE SEVERAL
VIEWS OF THE DRAWINGS

FIG. 3 shows a second embodiment of a measuring cell;

FIG. 4 shows a first inventive layout of a filling machine comprising at least one measuring cell as shown in FIGS. 1 and 2;

FIG. 7 shows an alternative embodiment of the measuring section, employing a rotary conveyor as opposed to translatory bottle conveying system.

DETAILED DESCRIPTION

Figure 2:
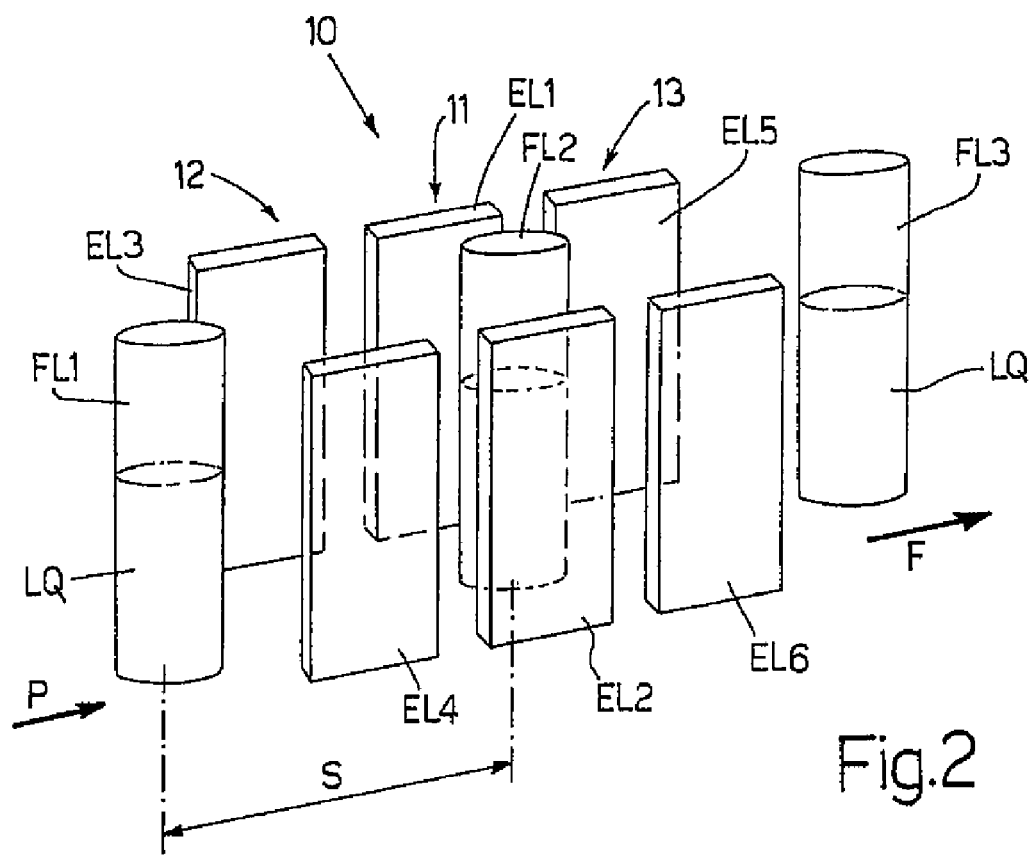
FIG. 2 shows a first embodiment of a measuring cell.

A non-limiting embodiment of the present invention will be described by way of example with reference to the attached FIGS. 2-7, in which:

Measuring liquids using the capacitive technique according to the present invention calls for a measuring cell 10, as shown by way of a non-limiting example in FIG. 2.

Container, which in one example includes bottles FL1, FL2, FL3, partly filled with liquid (or empty, in the case of straightforward tare measurements), are fed through measuring cell 10.

The measuring cell 10 in FIG. 2 comprises an actual measuring section 11 (central in FIG. 2), which is preceded by a first guard section 12, and followed by a second guard section 13 downstream from the first in the traveling direction, indicated by arrow F, along a path P.

Measuring section 11 in turn comprises two electrodes EL1, EL2 located on opposite sides of bottles FL1, FL2, FL3 traveling through.

Each guard section 12 and 13 comprises a pair of electrodes EL3, EL4 and EL5, EL6 kept at the same potential as the adjacent measuring electrodes EL1, EL2 by appropriate electronic means (not shown).

Electrodes EL3, EL4, EL5, EL6 do not take part directly in the measurement at measuring section 11.

Guard sections 12, 13, in fact, provide for regularizing the field lines in measuring section 11 (eliminating so-called "edge effects") and, above all, for reducing the effect of bottles FL1, FL3 on the measurement of bottle FL2 traveling through measuring section 11.

Appropriate spacing S of bottles FL1, FL2, FL3 (FIG. 2) also assists in making said effect negligible.

For measuring purposes, the geometric characteristics of measuring section 11 and guard sections 12, 13 are selected to achieve a desired result.

FIG. 2 only shows, by way of example, the electrodes EL1, EL2, EL3, EL4, EL5, EL6 involved in the measurement, and does not show a shield normally enclosing cell 10—except, obviously, for the inlet and outlet openings for bottles FL1, FL2, FL3—to render the measurement insensitive to external objects, to the movement of external objects, and to electric interference.

The shield normally comprises conducting walls (not shown) grounded electrically (not shown) or, when appropriate, connected electrically to guard potentials (not shown).

The capacitive measurement is obviously strongly affected by the conveying means supporting bottles FL1, FL2, FL3 being measured, and this must obviously be taken into account.

In this connection, various solutions are possible, including:
- a conveying system for feeding bottles FL1, FL2, FL3 through measuring section 11 so that the support of bottles FL1, FL2, FL3 is always the same (static or in the same position when the measurement is made);
- a cyclic step conveyor with characteristic individual steps; each bottle must therefore be positioned precisely at each step of the conveyor, and means, such as a position transducer or other locating device are provided to determine the particular step at which the bottle being measured is located; the principle is similar to that described in U.S. Pat. No. 5,750,938 referred to above;
- means, such as a belt, rotary tray, rollers, etc. made of homogeneous material, preferably with a low dielectric constant, so its contribution may be considered constant.

Adopting a rotary as opposed to translatory conveying system, as shown in the alternative embodiment in FIG. 7 described below, is particularly effective in solving the effect of the conveying means on the measurement.

Figure 1:
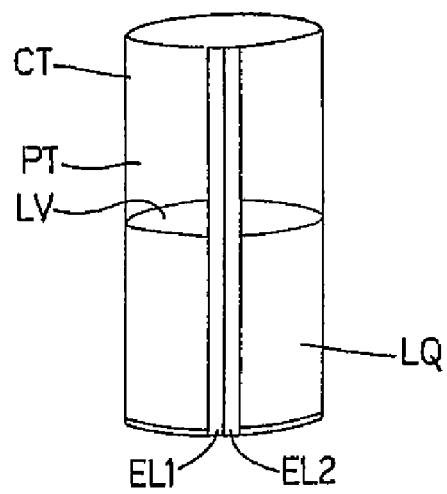
FIG. 1 is a side view of a known prior art technique for capacitive measurement.

In an alternative embodiment shown in FIG. 3, electrodes EL1 and EL2 of measuring section 11 (central in cell 10 in FIG. 1) are advantageously divided into a number of smaller electrodes EL11, EL12, EL13, EL14, EL15 and EL21, EL22, EL23, EL24, EL25, each connected to respective electronics (not shown) to form a measuring cell 20.

By measuring the mutual capacitances between all the pairs of electrodes (in particular, those on opposite sides, such as EL11, EL12, ..., EL15 with respect to EL21, EL22, ..., EL25), and by applying an appropriate algorithm, similar to those used in the well known "capacitive tomography" technique, information can be acquired concerning the spatial (in this case, height) distribution of the dielectric material.

But, above all, such "partial" measurements may advantageously be processed to achieve greater precision, particularly as regards independence of the measurement from the spatial distribution of the content inside the bottle, even in those situations in which the measurement is made while the bottle is moving, which is a common practice.

It should be pointed out that the geometry shown in FIG. 3 is purely schematic, to illustrate the principle involved. In actual fact, a different embodiment may be preferable, e.g., with the electrodes divided perpendicularly to the division shown in FIG. 3, and arranged, not in two parallel planes as shown, but in surfaces curving towards the bottle, so as to at least partly "surround" the top and bottom sides of the bottle as well.

FIG. 7 shows an alternative embodiment of the present invention. As can be seen, this solution closely resembles the one used for measuring capsules on capping machines in U.S. Pat. No. 5,750,938 referred to above, and in fact employs several of the techniques perfected by the Applicant in that patent.

In the FIG. 7 embodiment, bottles FL1, FL2, FL3 are conveyed in rotary manner by a "star wheel" 1, which, in FIG. 7, comprises a metal inner disk 1a fitted with a rim 2 of insulating material.

In rim 2 are formed a number of semicylindrical cavities CV, inside which bottles FL1, FL2, FL3 are preferably retained by a pneumatic suction system (not shown in FIG. 7).

The capacitive transducer in this case is defined by a measuring electrode EL1 and two guard electrodes EL3, EL5, which form a fixed cylindrical surface outwards of star wheel 1.

In other words, electrodes EL1, EL3, EL5 are in the form of cylindrical sections coaxial with star wheel 1.

Electrodes EL1, EL3, EL5 correspond respectively to similar electrodes EL1, EL3, EL5 in FIG. 2, whereas electrodes EL2, EL4, EL6 in FIG. 2 are incorporated in this case into a single electrode EL* defined by the cylindrical outer surface of metal disk 1a.

Incorporating electrodes EL2, EL4, EL6 into a single electrode EL* involves minor differences as regards the measurement, and a different embodiment of the electronic measuring section, which is unbalanced as opposed to balanced.

Electrodes EL1, EL3, EL5 and electrode EL* form a measuring cell 30.

As before, grounded shielding elements (not shown in FIG. 7) may be provided over the top and bottom and outwards of measuring cell 30.

As stated, this solution is particularly effective as regards the effect of the conveying means on the measurement, which in fact is affected repeatably by the conveying system and any construction defects in it. In the same way as for capsules, the characteristics of the system may therefore be determined as a function of the angular position of star wheel 1 so as to compensate the measurement.

Measuring cell 10 or 20 or 30 may be designed to be integrated directly in specially designed filling machines, or fitted to existing filling machines in a retrofitting technique.

If a gross-tare measuring system is adopted, one acceptable layout is as shown in FIG. 4.

The FIG. 4 layout comprises a tare measuring section 100 equipped with a cell 10 or 20 as described with reference to FIGS. 2 and 3 respectively into which an open, empty bottle FL is fed, and which is followed by a filling section 50 where bottle FL is filled with at least one substance and preferably a pharmaceutical, liquid substance.

As shown in FIG. 4, filling section 50 is followed by a gross measuring section 1000, also equipped with a cell 10 or 20 as described with reference to FIGS. 2 and 3 respectively in turn followed by a section 70 for applying the cap and metal ring.

The liquid content of each bottle FL is calculated by appropriately processing the readings in sections 1000 and 100.

Figure 5:
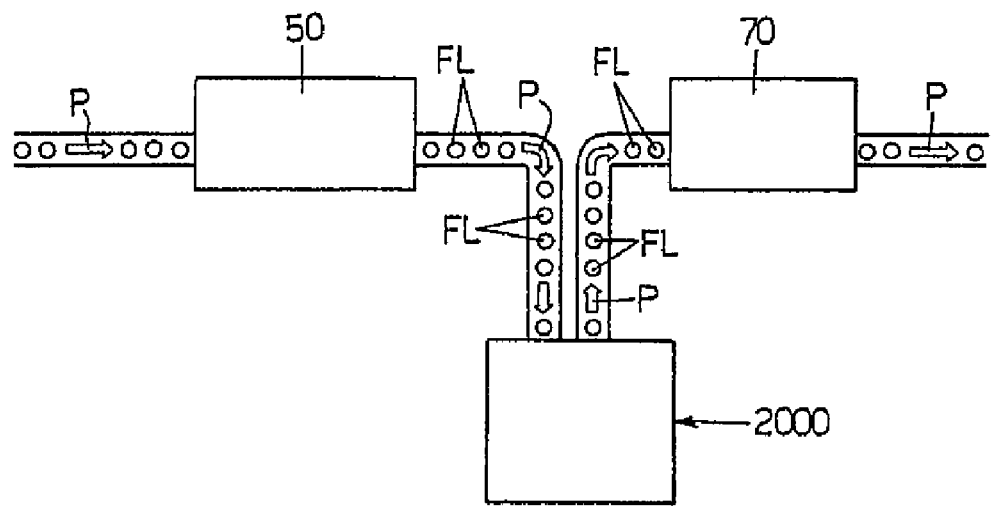
FIG. 5 shows a second inventive layout of a filling machine comprising at least one measuring cell as shown in FIGS. 1 and 2.

FIG. 5 shows a further layout, in which a single section 2000 for determining the liquid content of bottle FL is interposed between a filling section 50 and a section 70 for applying the cap and metal ring.

Figure 6:
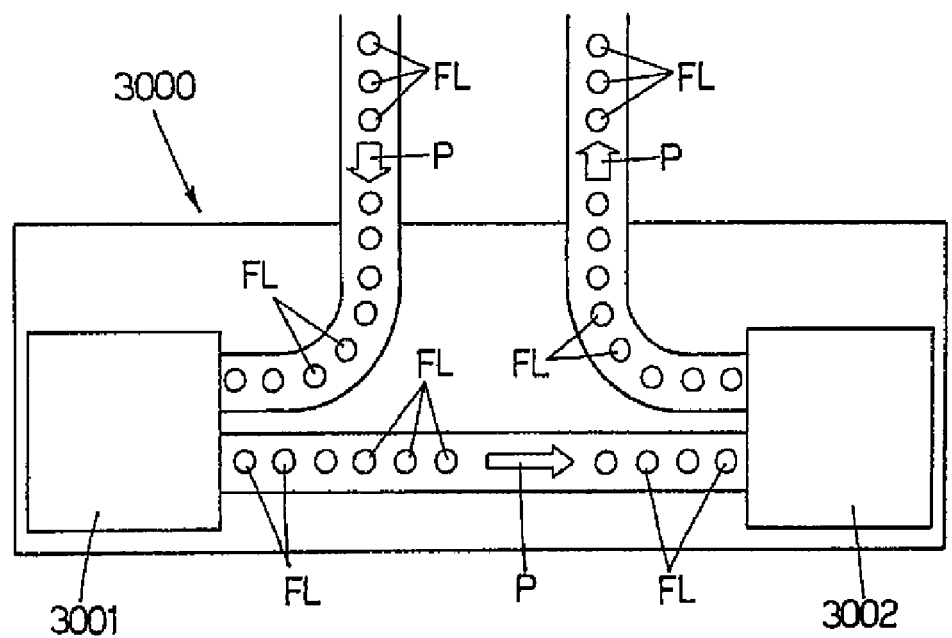
FIG. 6 shows a third inventive layout of a filling machine comprising at least one measuring cell as shown in FIGS. 1 and 2.

In the embodiment of the FIG. 6 layout, the mechanical sample weighing function 3001 and the 100% capacitive measuring function 3002 are contained in one section 3000. The containers filled can be bottles, capsules or other containers.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for sequentially measuring a quantity of liquid in each of a plurality of containers, comprising:
   at least one capacitive measuring cell having a measuring section, a first capacitive guard section preceding the measuring section and a second capacitive guard section following the measuring section, the first and second capacitive guard sections having electrodes positioned to regularize field lines in said measuring section, and the measuring section having a first plurality of electrodes positioned on a first side of the measuring section and a second plurality of electrodes positioned on a second side of the measuring section opposite the first side; and
   a conveying system for feeding each of the plurality of containers along a path through the at least one capacitive measuring cell,
   wherein the measuring section of the at least one capacitive measuring cell measures mutual capacitances between pairs of electrodes containing one electrode from each of the first and the second plurality of electrodes of the measuring section to obtain information concerning the height of the liquid in each of the plurality of containers by which to determine the quantity of the liquid therein.

2. The apparatus as claimed in claim 1, comprising a shield enclosing said measuring cell to render the measurement insensitive to external objects, to the movement of external objects, and to electric interference.

3. The apparatus as claimed in claim 2 wherein the shield comprises a number of conducting walls grounded electrically or connected electrically to guard potentials.

4. The apparatus as claimed in claim 1 wherein the containers are conveyed in rotary manner along a circular path.

5. An apparatus for weighing liquid in a bottle, in particular a pharmaceutical bottle, the apparatus comprising: at least one measuring cell, and conveying means for feeding a number of bottles along a path, the measuring cell comprising a measuring section preceded by a first guard section and followed by a second guard section, said guard sections regularizing the field lines in the measuring section; wherein the measuring section includes a first plurality of electrodes positioned on a first side of the measuring section and a second plurality of electrodes positioned on a second side of the measuring section opposite the first side, and wherein the measuring section of the at least one measuring cell measures mutual capacitances between pairs of electrodes containing one electrode from each of the first and the second plurality of electrodes of the measuring section, and by applying a capacitive tomography technique in a quality control system coupled to the at least one measuring cell, information concerning the spatial distribution of the liquid in each of the bottles is obtained by which to a determine weight of the liquid.

6. The apparatus as claimed in claims 5 wherein the first and the second plurality of electrodes of the measuring section are arranged horizontally in opposing parallel planes.

7. The apparatus as claimed in claim 5 wherein the first and the second plurality of electrodes of the measuring section are arranged vertically in opposing parallel planes.

8. The apparatus as claimed in claim 5 wherein the first and the second plurality of electrodes of the measuring section are arranged vertically and include a curvature to at least partially surround a top and a bottom portion of the bottle when the bottle moves through the measuring section.

* * * * *